United States Patent
Sun et al.

(10) Patent No.: US 9,118,707 B2
(45) Date of Patent: Aug. 25, 2015

(54) METHODS AND SYSTEMS FOR MITIGATING ATTACK TRAFFIC DIRECTED AT A NETWORK ELEMENT

(71) Applicant: Verizon Patent and Licensing Inc., Arlington, VA (US)

(72) Inventors: Lin Sun, San Ramon, CA (US); Yee Sin Chan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 3 days.

(21) Appl. No.: 13/715,651

(22) Filed: Dec. 14, 2012

(65) Prior Publication Data

US 2014/0173722 A1    Jun. 19, 2014

(51) Int. Cl.
H04L 29/06    (2006.01)

(52) U.S. Cl.
CPC ........ H04L 63/1433 (2013.01); H04L 63/0227 (2013.01); H04L 63/0236 (2013.01); H04L 63/1441 (2013.01); H04L 63/1458 (2013.01)

(58) Field of Classification Search
CPC ............ H04L 63/1433; H04L 63/1441; H04L 63/145; H04L 63/1458; H04L 63/1408; H04L 63/0227; H04L 63/0236
USPC .......... 726/11, 12, 22, 23, 24, 25, 13
See application file for complete search history.

(56) References Cited

U.S. PATENT DOCUMENTS

| | | | |
|---|---|---|---|
| 7,891,001 B1* | 2/2011 | Greenawalt et al. | 726/22 |
| 8,799,514 B1* | 8/2014 | Vautrin et al. | 709/245 |
| 2002/0133586 A1* | 9/2002 | Shanklin et al. | 709/224 |
| 2003/0028806 A1* | 2/2003 | Govindarajan et al. | 713/201 |
| 2005/0039051 A1* | 2/2005 | Erofeev | 713/201 |
| 2005/0210126 A1* | 9/2005 | Friedman | 709/220 |
| 2006/0161980 A1* | 7/2006 | Huitema et al. | 726/22 |
| 2006/0253900 A1* | 11/2006 | Paddon et al. | 726/11 |
| 2006/0285493 A1* | 12/2006 | Manuja et al. | 370/235 |
| 2007/0083927 A1* | 4/2007 | Swaroop | 726/22 |
| 2007/0124813 A1* | 5/2007 | Ormazabal et al. | 726/11 |
| 2007/0239893 A1* | 10/2007 | Crowe | 709/245 |
| 2008/0082662 A1* | 4/2008 | Dandliker et al. | 709/225 |
| 2008/0151875 A1* | 6/2008 | Lim | 370/352 |
| 2008/0163373 A1* | 7/2008 | Maynard | 726/25 |
| 2009/0138959 A1* | 5/2009 | Im et al. | 726/13 |
| 2009/0254990 A1* | 10/2009 | McGee | 726/22 |
| 2010/0262645 A1* | 10/2010 | Brown et al. | 709/203 |
| 2011/0185039 A1* | 7/2011 | Ueno et al. | 709/217 |
| 2011/0231574 A1* | 9/2011 | Saunderson et al. | 709/245 |
| 2012/0023257 A1* | 1/2012 | Vos et al. | 709/232 |
| 2012/0255022 A1* | 10/2012 | Ocepek et al. | 726/25 |
| 2012/0287931 A1* | 11/2012 | Kidambi et al. | 370/392 |
| 2014/0007241 A1* | 1/2014 | Gula et al. | 726/25 |
| 2014/0013434 A1* | 1/2014 | Ranum et al. | 726/24 |

* cited by examiner

*Primary Examiner* — Harunur Rashid
*Assistant Examiner* — Sher Khan (57) ABSTRACT

An exemplary method includes an attack traffic mitigation system 1) identifying a range of ports left open by a firewall for a network element to receive network traffic provided by a computing device, 2) designating a subset of one or more ports included in the range of open ports as being included in a legitimate port range configured to receive legitimate network traffic provided by the computing device, and 3) directing the network element to drop network traffic provided by the computing device and received by each port included in the range of open ports that is not included in the legitimate port range. Corresponding methods and systems are also disclosed.

17 Claims, 10 Drawing Sheets

METHODS AND SYSTEMS FOR MITIGATING ATTACK TRAFFIC DIRECTED AT A NETWORK ELEMENT

BACKGROUND INFORMATION

Computing devices often communicate with each other by routing data through one or more network elements. For example, a first computing device (e.g., a mobile phone) may route data (e.g., real-time transport protocol ("RTP") data) intended for a second computing device (e.g., another mobile phone) through a network-based transcoder, which may transcode the data into a format supported by the second mobile device. In some instances (e.g., in cases where the second computing device is not available), the data transmitted by the first computing device may terminate at a network element (e.g., a voicemail server).

In either scenario, a firewall may be used to prevent unauthorized data from reaching a network element. For example, a firewall may be used to prevent attack traffic (e.g., data intended to interrupt, corrupt, or otherwise interfere with one or more operations of the network element) from reaching the network element.

To facilitate some types of communication (e.g., RTP communication) between a computing device and a network element, a firewall may have to leave an entire range of ports associated with a network element (e.g., an entire user datagram protocol ("UDP") port range associated with the network element) open. Unfortunately, this may allow malware residing on the computing device to spam or otherwise attack the network device by transmitting attack traffic to the network device by way of one or more of the open ports.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for mitigating attack traffic directed at a network element are described herein. For example, as will be described below, an attack traffic mitigation system may 1) identify a range of ports left open by a firewall for a network element to receive network traffic provided by a user device, 2) designate a subset of one or more ports included in the range of open ports as being included in a legitimate port range configured to receive legitimate network traffic provided by the user device, and 3) direct the network element to drop network traffic provided by the user device and received by each port included in the range of open ports that is not included in the legitimate port range.

To illustrate, the attack traffic mitigation system may determine that an entire UDP port range has been left open by a firewall to facilitate RTP communication between a computing device and a network element. In response, the attack traffic mitigation system may randomly select one or more of the open ports for inclusion within a legitimate port range (e.g., a range that includes fewer ports than the entire UDP port range). The attack traffic mitigation system may then direct the computing device to transmit legitimate network traffic (e.g., RTP data generated by a legitimate application residing on the computing device) to the one or more randomly selected ports included in the legitimate port range. The attack traffic mitigation system may also direct the network element to drop (i.e., ignore) network traffic (e.g., attack traffic generated by malware residing on the computing device) received by any port not included in the legitimate port range. In this manner, even if the computing device transmits attack traffic to all of the open ports included in the UDP port range, much of the attack traffic is dropped by the network element, thereby mitigating (e.g., completely obviating) a disruptive effect of the attack traffic on the network element.

Figure 1:
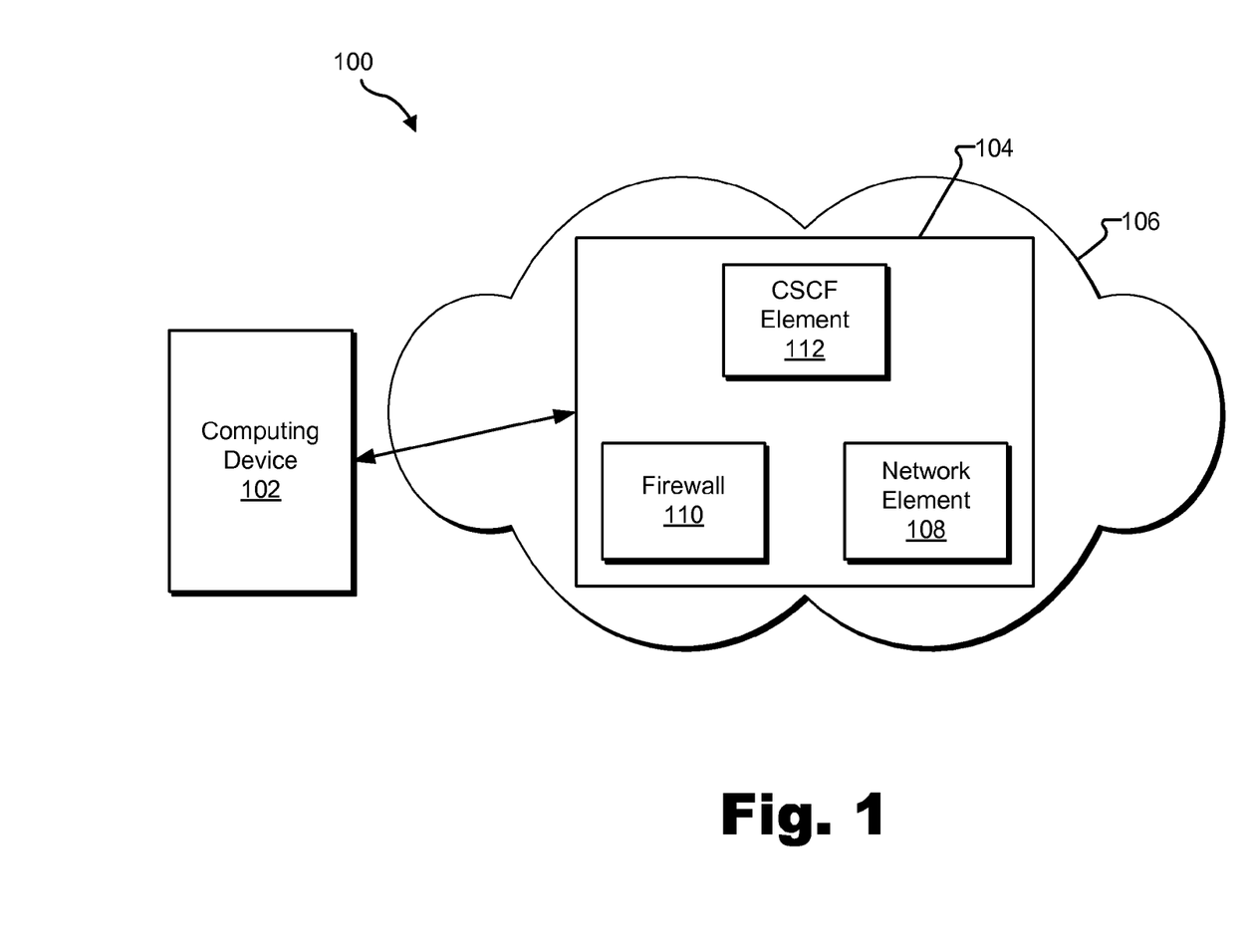
FIG. 1 illustrates an exemplary configuration in which a computing device is communicatively coupled to network element system according to principles described herein.

FIG. 1 illustrates an exemplary configuration 100 in which a computing device 102 is communicatively coupled to a network element system 104. As will be described below, various components of the attack traffic mitigation system described herein may be implemented by network element system 104. Additionally or alternatively, various components of the attack traffic mitigation system described herein may be implemented by a system (e.g., a third-party server) separate from network element system 104, as will also be described below.

Computing device 102 and network element system 104 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Computing device 102 and network element system 104 may communicate using any suitable network. For example, as shown in FIG. 1, computing device 102 and network element system 104 may be configured to communicate with each other by way of network 106. Network 106 may include one or more networks or types of networks capable of carrying communications and/or data signals between computing device 102 and network element system 104. For example, network 106 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

Computing device 102 may be implemented by a mobile or wireless device (e.g., a mobile phone and/or a tablet computer), a personal computer, a set-top box device, a digital video recorder ("DVR") device, a personal-digital assistant device, a gaming device, a television device, and/or any other suitable computing device configured to transmit data (e.g., in the form of network traffic) to network element system 104. As will be described below, the data may be intended for one or more network elements included in network element system 104 and/or for one or more other computing devices communicatively coupled to network element system 104.

Network element system 104 may be implemented by one or more network-based computing devices (e.g., one or more servers associated with one or more entities) and configured to provide one or more network services to computing device 102. For example, network element system 104 may provide one or more transcoding services, data routing services, voicemail services, session border controller ("SBC") services, communication services, media streaming services (e.g., video streaming services), and/or any other type of network service as may serve a particular implementation. To illustrate, network element system 104 may be implemented by an Internet protocol media subsystem ("IMS") configured to provide one or more IP multimedia services to one or more computing devices (e.g., computing device 102).

Network element system 104 may provide the one or more network services by way of network 106. For this reason, network element system 104 is shown in FIG. 1 as being disposed within network 106. However, it will be recognized that this is for illustrative purposes only and that network element system 104 may be separate from network 106.

In some examples, network element system 104 may be associated with (e.g., provided and/or managed by) a network service provider (e.g., a provider of network 106, such as a wireless network service provider, a subscriber television service provider, an Internet service provider, a DVR service provider, etc.). Alternatively, network element system 104 may be associated with an entity separate from a provider of network 106 (e.g., a media content provider).

As shown, network element system 104 may include various components. For example, network element system 104 may include a network element 108, a firewall 110, and a call session control function ("CSCF") element 112. It will be recognized that network element system 104 may additionally or alternatively include any other component as may serve a particular implementation.

Network element 108 may include any logical entity configured to provide one or more network services (e.g., to computing device 102). For example, network element 108 may be implemented by one or more computing devices executing one or more applications configured to provide one or more transcoding services, data routing services, voicemail services, SBC services, communication services, media streaming services, and/or any other type of network service as may serve a particular implementation.

Network element 108 may have a plurality of ports associated therewith. As used herein, a "port" refers to an application-specific or process-specific software construct serving as a communications endpoint for network element 108. In other words, a port may uniquely identify a particular application or process executed by the network element 108. Hence, to provide information that may be used by a particular application or process executed by the network element 108, a computing device (e.g., computing device 102) may transmit data representative of a port associated with the application or process (e.g., in the form of a packet header) together with the information to network element 108.

In some examples, a port may be associated with a particular communication protocol. For example, network element 108 may include a range of ports associated with UDP, TCP, and/or any other communication protocol as may serve a particular implementation.

Firewall 110 may be configured to protect network element 108 (e.g., by preventing authorized data from reaching network element 108). To this end, network element system 104 may route network traffic (e.g., data provided by computing device 102) through firewall 110 prior to the network traffic being routed to network element 108.

In some examples, firewall 110 may specify whether one or more ports associated with network element 108 are open or closed. Data transmitted to an open port may be received by network element 108. Data transmitted to a closed port may be blocked from reaching network element 108. In some examples, as described above, firewall 110 may leave a range of ports (e.g., an entire UDP port range) open to facilitate certain types of communications (e.g., RTP traffic) between network element 108 and one or more computing devices (e.g., computing device 102).

CSCF element 112 may be configured to process signaling packets provided by user devices (e.g., user device 102) and network element 108. For example, CSCF element 112 may be implemented by one or more session SIP servers or proxies configured to process SIP signaling packets in an IMS. In some examples, CSCF element 112 may provide a unique call session control function for each computing device (e.g., computing device 102) communicatively coupled to network element system 104.

Figure 2:
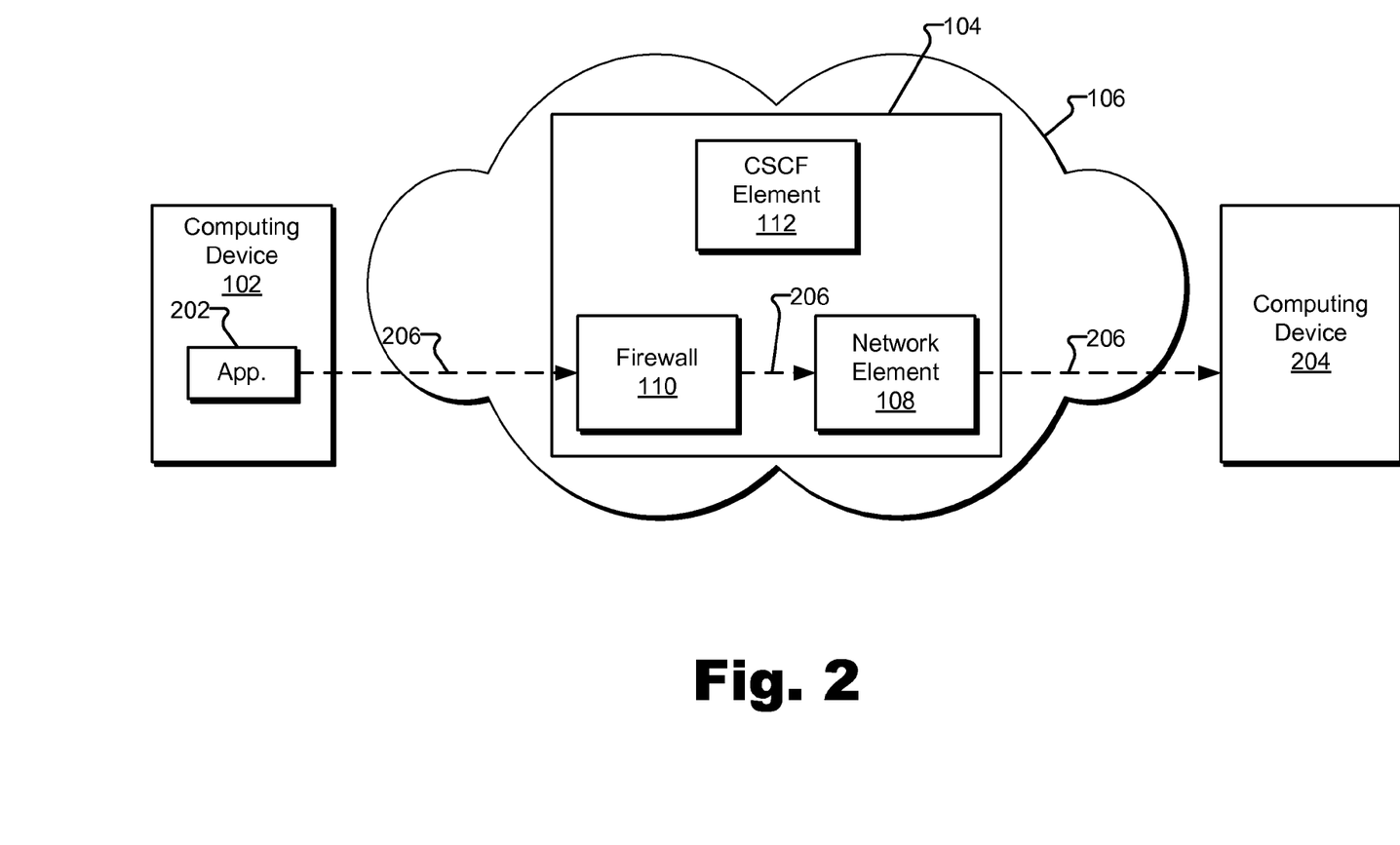
FIGS. 2-3 illustrate exemplary data flows that may be realized in accordance with the configuration of FIG. 1 according to principles described herein.

FIG. 2 illustrates an exemplary data flow that may be realized in accordance with the configuration 100 of FIG. 1. In this example, an application 202 residing on computing device 102 may generate or otherwise provide data intended for another computing device 204. It will be recognized that the data may alternatively be intended for network element 108 (e.g., in cases where computing device 204 is unavailable).

As shown, computing device 102 may transmit the data generated by application 202 to computing device 204 by way of firewall 110 and network element 108 in the form of network traffic 206. In some examples, network element 108 may process network traffic 206 prior to transmitting network traffic 206 to computing device 204 in order to provide one or more of the network services described herein.

Unfortunately, computing device 102 may also have malware residing thereon. The malware may be configured to generate attack traffic directed at network element 108. Exemplary attack traffic includes distributed denial-of-service ("DDoS") attack traffic configured to render network element 110 unavailable to its intended users.

Figure 3:
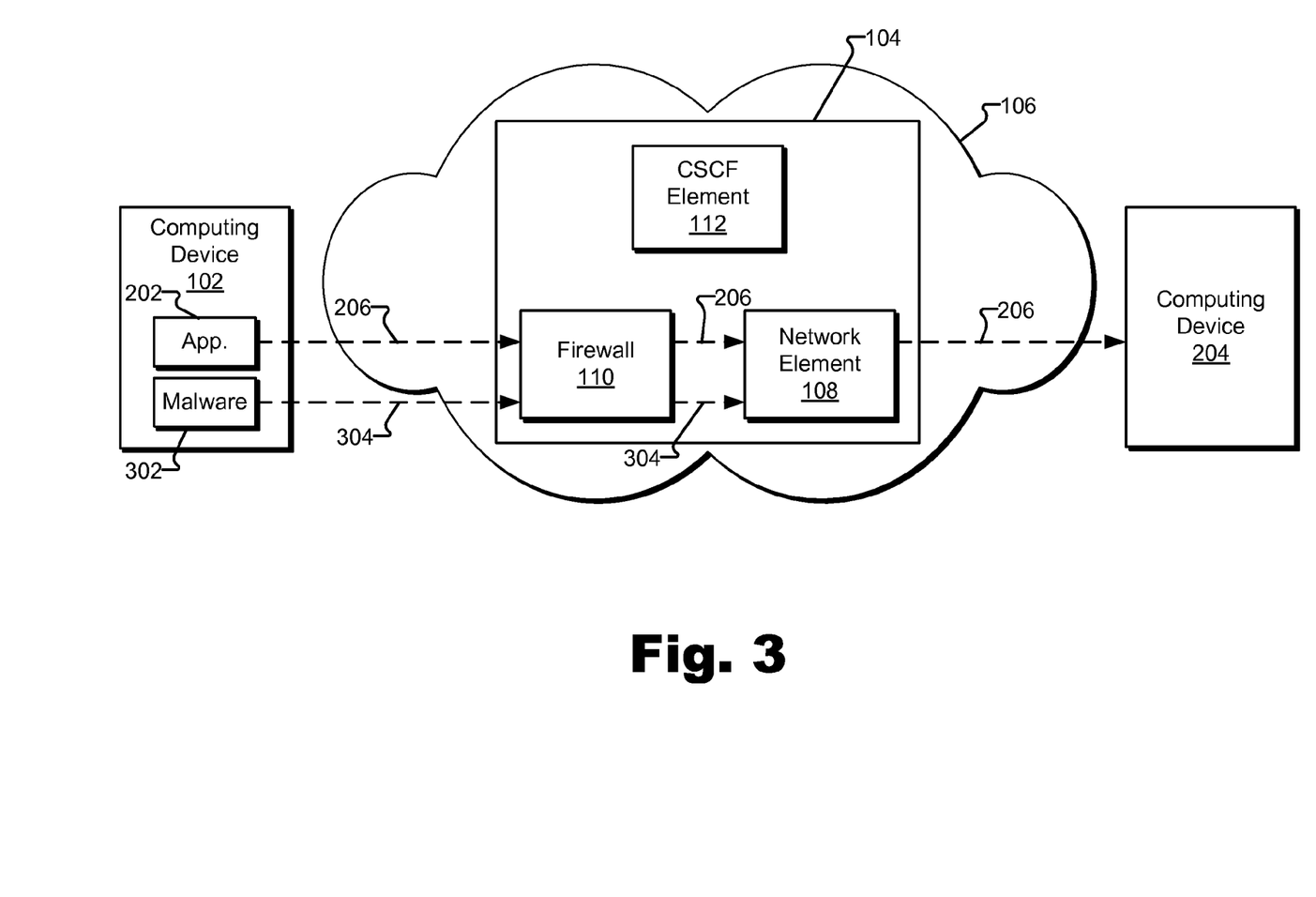

To illustrate, FIG. 3 shows that computing device 102 may also include malware 302 residing thereon. Malware 302 may generate attack data, which may be transmitted by computing device 102 in the form of attack traffic 304 to network element 108 by way of firewall 110. As mentioned, attack traffic 304 may penetrate firewall 110 by exploiting one or more ports left open by firewall 110.

Figure 4:
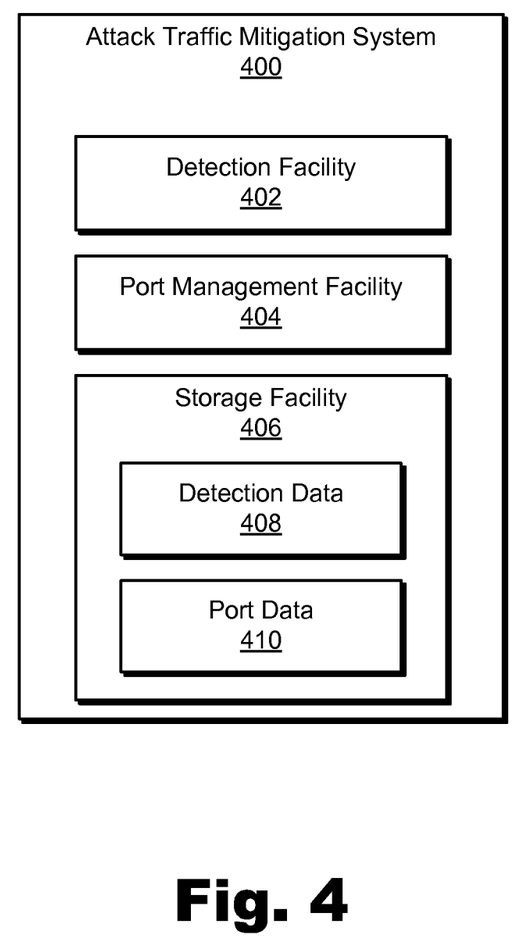
FIG. 4 illustrates an exemplary attack traffic mitigation system according to principles described herein.

FIG. 4 illustrates an exemplary attack traffic mitigation system 400 that may be used to mitigate attack traffic provided by malware (e.g., malware 302) residing on a computing device (e.g., computing device 102) in communication with a network element (e.g., network element 108). As shown, system 400 may include, without limitation, a detection facility 402, a port management facility 404, and a storage facility 406 selectively and communicatively coupled to one another. It will be recognized that although facilities 402-406 are shown to be separate facilities in FIG. 4, any of facilities 402-406 may be combined into fewer facilities, such as into a single facility, or divided into more facilities as may serve a particular implementation.

System 400 may be implemented by any suitable combination of computing devices and/or systems. For example, facilities 402-406 of system 400 may be implemented entirely by network element system 104 (e.g., by network element 108 itself, CSCF element 112, or a combination thereof), by a system separate from network element system 104 (e.g., by at least one server communicatively coupled to network element system 104), and/or by any other device and/or system. Alternatively, facilities 402-406 of system 400 may be distributed across any combination of these systems and/or devices.

Detection facility 402 may be configured to identify a range of ports left open by a firewall (e.g., firewall 110) for a network element (e.g., network element 108) to receive network traffic provided by a computing device (e.g., computing device 102). This may be performed in any suitable manner. For example, detection facility 402 may access one or more settings associated with the firewall and/or any other data that identifies which ports are open. In some examples, the range of ports left open by the firewall includes an entire range of ports associated with a particular communication protocol (e.g., an entire range of UDP ports).

Port management facility 404 may perform one or more port management operations as may serve a particular implementation. For example, port management facility 404 may designate a subset of one or more ports included in the range of open ports as being included in a legitimate port range configured to receive legitimate network traffic provided by the computing device. This may performed in any suitable manner.

For example, port management facility 404 may designate the subset of one or more ports as being included in the legitimate port range by randomly selecting the one or more ports for inclusion in the legitimate port range in accordance with a randomized port selection heuristic. The randomized port selection heuristic may include any suitable randomized selection heuristic and may prevent any malware residing on the computing device from ascertaining which ports are included in the legitimate port range.

It will be recognized that any number of ports less than the total number of ports included in the range of open ports may be selected for inclusion in the legitimate port range. For example, in some cases, a single port may be selected for inclusion in the legitimate port range. In other cases, multiple ports may be selected for inclusion in the legitimate port range as long as the total number of ports selected for inclusion in the legitimate port range is less than the total number of ports included in the range of open ports.

In some examples, port management facility 404 may designate the subset of one or more ports as being included in the legitimate port range by directing the computing device to route the legitimate network traffic to the designated subset of one or more ports. For example, port management facility 404 may direct the computing device to include data identifying a particular port included in the subset of one or more ports in a packet header associated with data that the computing device transmits to the network element.

In some examples, port management facility 404 may negotiate with the computing device to designate the one or more ports for inclusion in the legitimate port range. To illustrate, port management facility 404 may negotiate with the computing device by selecting the one or more ports for inclusion in the legitimate port range, transmitting a message comprising data representative of the selected one or more ports to the computing device, and receiving, in response to the message, an acknowledgement of the selected one or more ports from the computing device.

Figure 5:
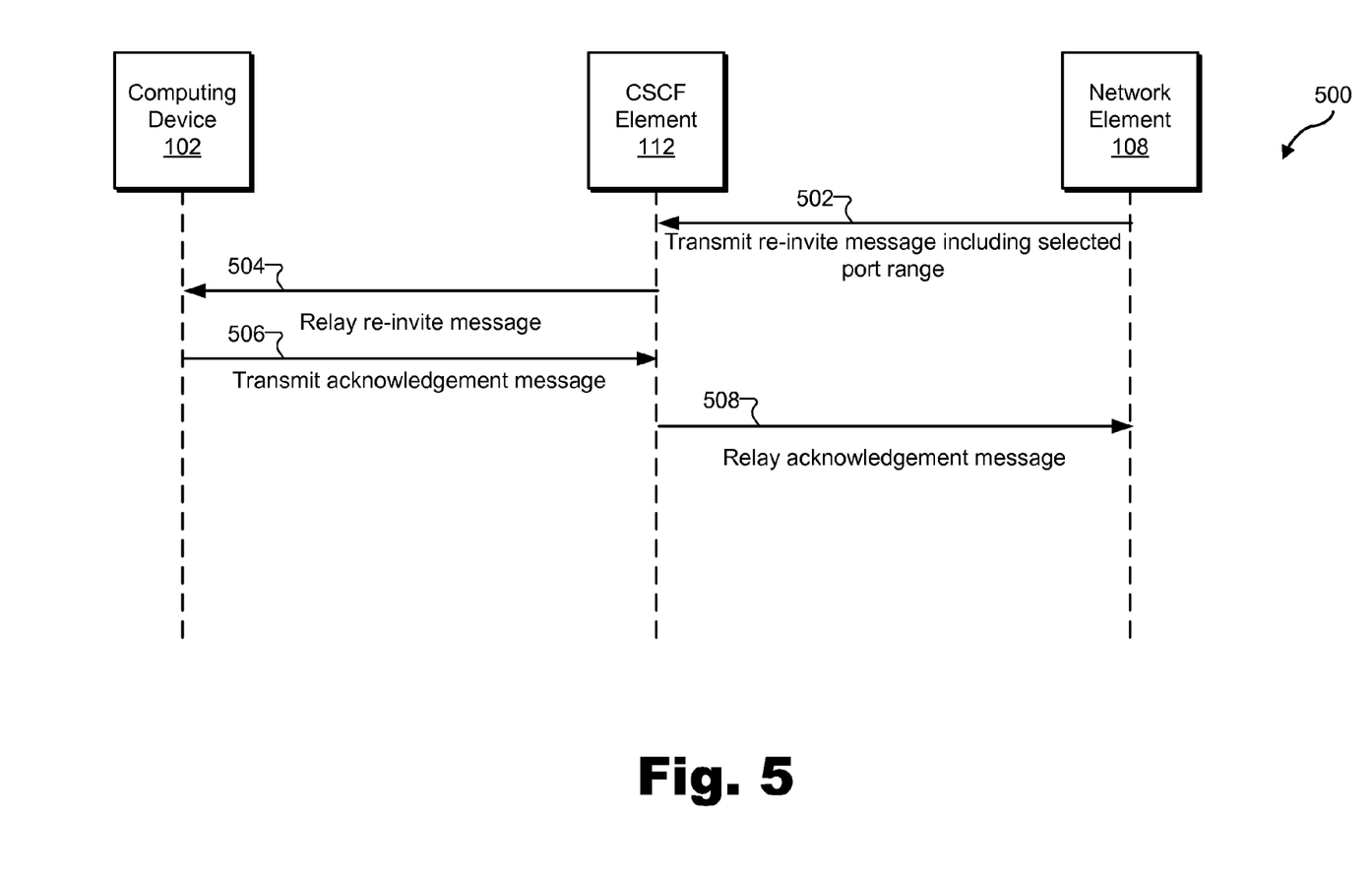
FIGS. 5-6 show sequence diagrams representative of exemplary negotiation processes that may be performed to designate one or more ports as being included in a legitimate port range according to principles described herein.

As an example, port management facility 404 may be at least partially implemented by network element 108 and CSCF element 112. In this implementation, the negotiation may be performed in accordance with the sequence diagram 500 illustrated in FIG. 5. While FIG. 5 illustrates exemplary steps according to one embodiment, other embodiments may omit, add to, reorder, and/or modify any of the steps shown in FIG. 5.

In step 502, network element 108 transmits a re-invite message that includes data representative of a selected port range to CSCF element 112. The selected port range may include one or more ports selected by network element 108 for inclusion in the legitimate port range. The re-invite message may include any type of message generated and transmitted in accordance with any type of communication protocol. For example, the re-invite message may include a session description protocol ("SDP") message.

In step 504, CSCF element 112 relays the re-invite message to computing device 102. This may be performed in any suitable manner.

Computing device 102 may process the re-invite message to ascertain the selected port range and update one or more of its communication settings with data representative of the selected port range. For example, computing device 102 may update one or more port addressing settings used by application 202 to transmit data to network element 108 with data representative of the selected port range.

In step 506, computing device 102 transmits an acknowledgement message to CSCF element 112 in response to receiving and processing the re-invite message. The acknowledgement message may include any suitable acknowledgement message (e.g., a 200 OK SDP message) configured to acknowledge the selected port range.

In step 508, CSCF element 112 relays the acknowledgement message to network element 108. This may be performed in any suitable manner. Network element 108 may then drop network traffic (e.g., attack traffic generated by malware 302 residing on computing device 102) received by all ports not included in the legitimate port range and appropriately process network traffic (e.g., network traffic generated by a legitimate application 202 residing on computing device 102) received by ports included in the legitimate port range.

Figure 6:
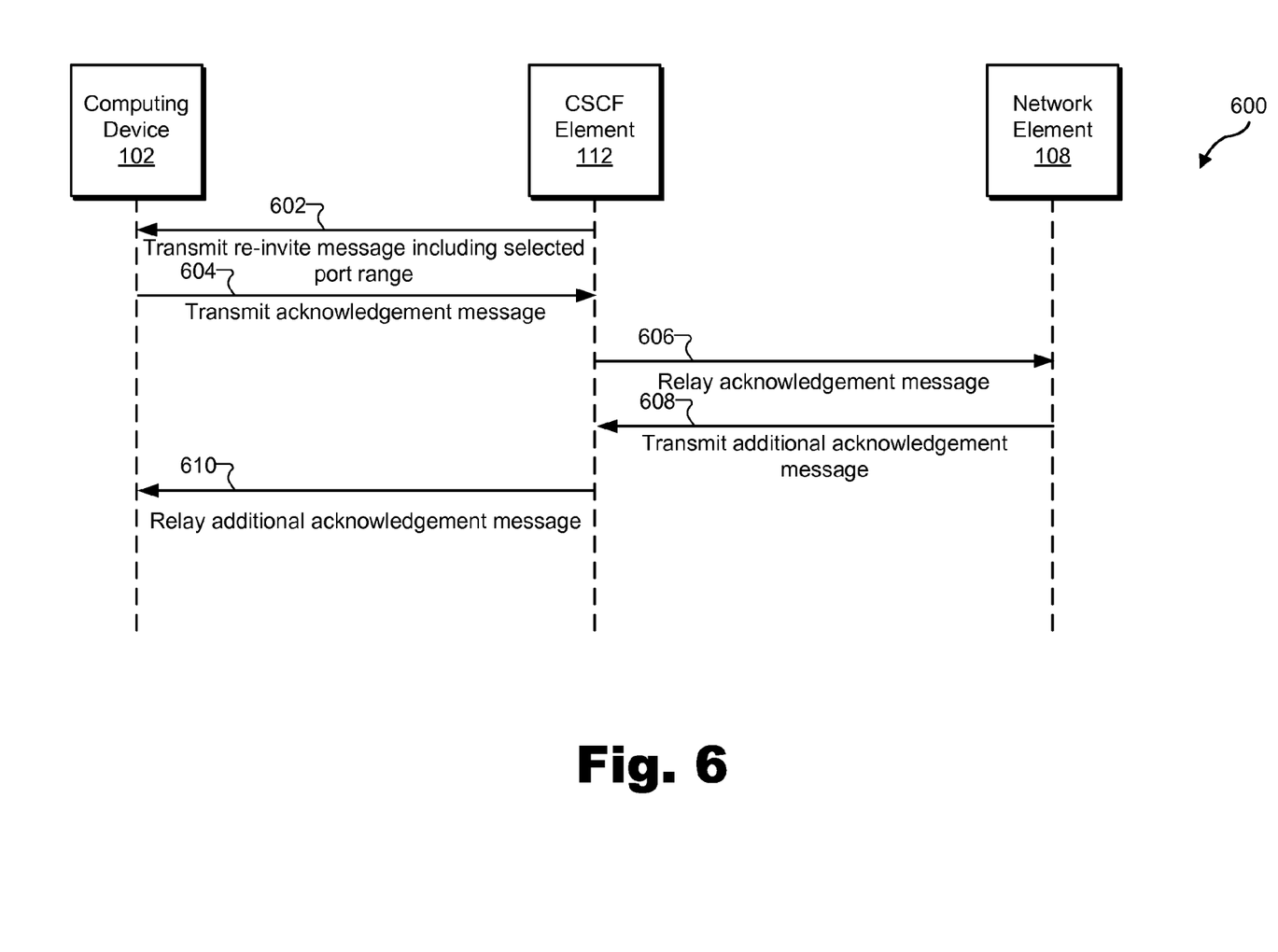

FIG. 6 shows a sequence diagram 600 representative of another exemplary negotiation process that may be performed by port management facility 404. In the example of FIG. 6, port management facility 404 is again at least partially implemented by network element 108 and CSCF element 112. In some alternative examples, the functions performed by CSVC element 112 in sequence diagram 600 may be performed by any other element, device, and/or system. While FIG. 6 illustrates exemplary steps according to one embodiment, other embodiments may omit, add to, reorder, and/or modify any of the steps shown in FIG. 6.

In the example of FIG. 6, CSCF element 112 may select a port range for inclusion in the legitimate port range. CSCF element 112 may then transmit a re-invite message that includes data representative of a selected port range to computing device 102 (step 602). As described above, the re-invite message may include any type of message generated and transmitted in accordance with any type of communication protocol. For example, the re-invite message may include a session description protocol ("SDP") message.

Computing device 102 may process the re-invite message to ascertain the selected port range and update one or more of its communication settings with data representative of the selected port range, as described above. In step 604, computing device 102 transmits an acknowledgement message to CSCF element 112 in response to receiving and processing the re-invite message. The acknowledgement message may include any suitable acknowledgement message (e.g., a 200 OK SDP message) configured to acknowledge the selected port range.

In step 606, CSCF element 112 relays the acknowledgement message to network element 108. In some examples, the acknowledgement message may include data representative of the selected port range. Network element 108 may process the acknowledgement message to ascertain the selected port range and update one or more settings accordingly. For example, network element 108 may update one or more settings that specify which ports are included in the legitimate port range.

In step 608, network element 108 transmits an additional acknowledgement message to CSCF element 112, which relays the additional acknowledgement message to computing device in step 610. The additional acknowledgement message may include any suitable acknowledgement message (e.g., a 200 OK SDP message) configured to acknowledge the selected port range.

Returning to FIG. 4, port management facility 404 may be configured to periodically designate different subsets of one or more ports as being included in the legitimate port range. For example, a first subset of one or more ports may be initially designated as being included in the legitimate port range. After a predetermined amount of time subsequent to the initial designation, port management facility 404 may remove the subset of one or more ports from being included in the legitimate port range and designate a new subset of one or more ports as being included in the legitimate port range. The new subset of one or more ports may include at least one port not included in the initially designated subset of one or more ports.

Figure 7:
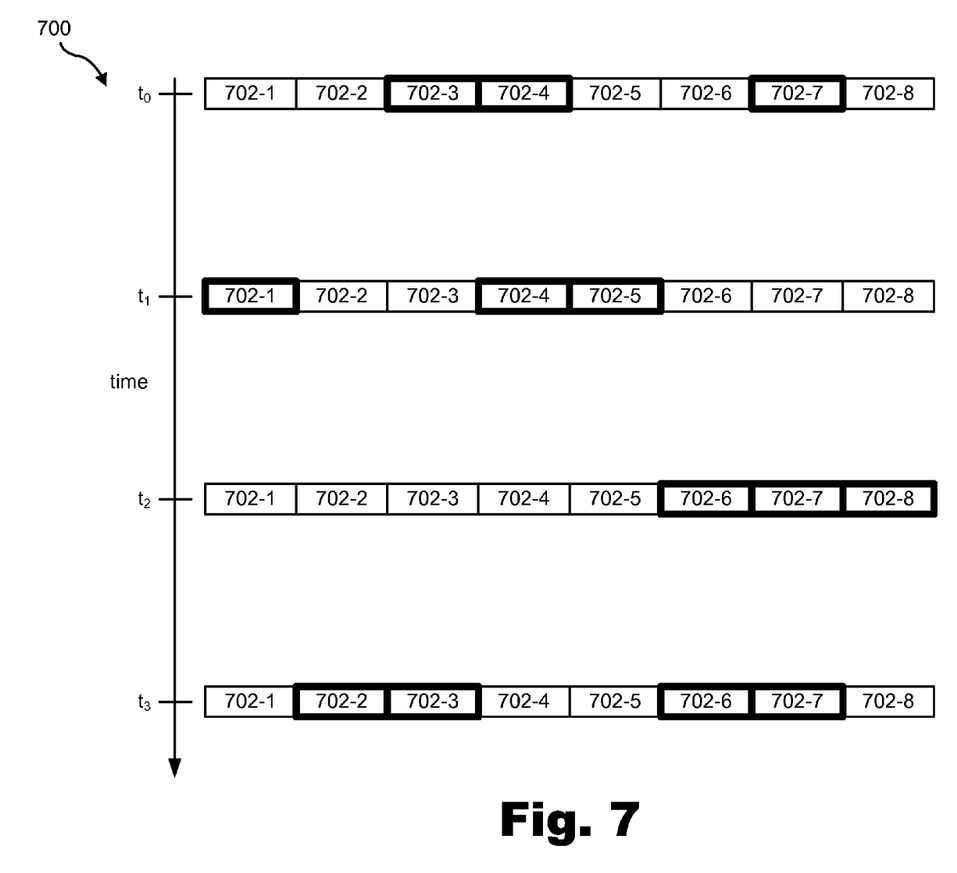
FIG. 7 shows an exemplary timeline during which a port management facility periodically designates different subsets of ports as being included in a legitimate port range according to principles described herein.

To illustrate, FIG. 7 shows an exemplary timeline 700 during which port management facility 404 periodically designates different subsets of ports as being included in the legitimate port range. In the example of FIG. 7, a firewall (e.g., firewall 110) has left a range of eight ports 702 (i.e., ports 704-1 through 704-8) open for communication between a computing device (e.g., computing device 102) and a network element (e.g., network element 108).

At time $t_0$, port management facility 404 may designate ports 702-3, 702-4, and 702-7 as being included in the legitimate port range. This designation is illustrated in FIG. 7 by the relatively heavily weighted boxes that surround each of ports 702-3, 702-4, and 702-7.

After a predetermined amount of time (or, alternatively, after a randomly selected amount of time), port management facility 404 may select a new subset of ports 702 for inclusion in the legitimate port range (i.e., a new subset of ports 702 to replace the subset of ports designated at time $t_0$). For example, FIG. 7 shows that at time $t_1$, port management facility 404 designates ports 702-1, 702-4, and 702-5 as being included in the legitimate port range.

In a similar manner, as shown in FIG. 7, ports 702-6, 702-7, and 702-8 may be designated as being included in the legitimate port range at time $t_2$ and ports 702-2, 702-3, 702-6, and 702-7, may be designated as being included in the legitimate port range at time $t_3$.

Returning to FIG. 4, storage facility 406 may be configured to store detection data 408 generated and/or used by detection facility 402 and port data 410 generated and/or used by port management facility 404. Storage facility 406 may maintain additional or alternative data as may serve a particular implementation.

Figure 8:
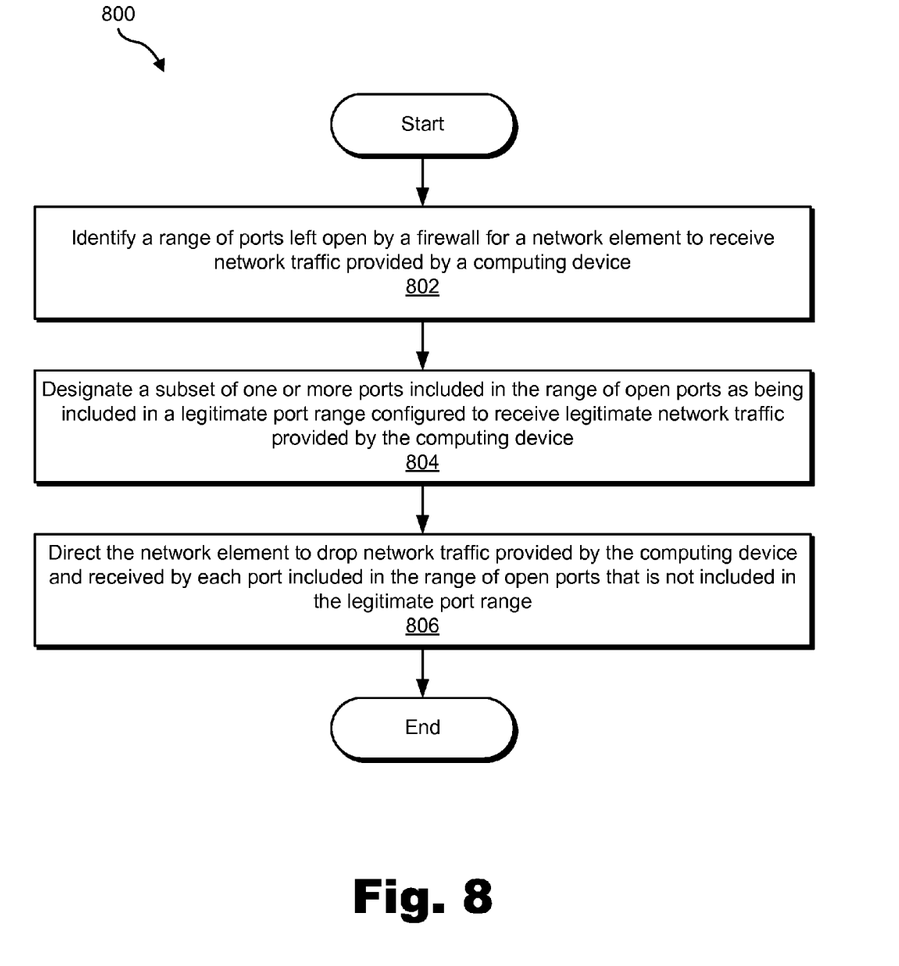
FIG. 8 illustrates an exemplary method of mitigating attack traffic directed at a network element according to principles described herein.

FIG. 8 illustrates an exemplary method 800 of mitigating attack traffic directed at a network element. While FIG. 8 illustrates exemplary steps according to one embodiment, other embodiments may omit, add to, reorder, and/or modify any of the steps shown in FIG. 8. One or more of the steps shown in FIG. 8 may be performed by attack traffic mitigation system 400 and/or any implementation thereof.

In step 802, an attack traffic mitigation system identifies a range of ports left open by a firewall for a network element to receive network traffic provided by a computing device. Step 802 may be performed in any of the ways described herein.

In step 804, the attack traffic mitigation system designates a subset of one or more ports included in the range of open ports as being included in a legitimate port range configured to receive legitimate network traffic provided by the computing device. Step 804 may be performed in any of the ways described herein.

In step 806, the attack traffic mitigation system directs the network element to drop network traffic provided by the computing device and received by each port included in the range of open ports that is not included in the legitimate port range. Step 806 may be performed in any of the ways described herein.

Figure 9:
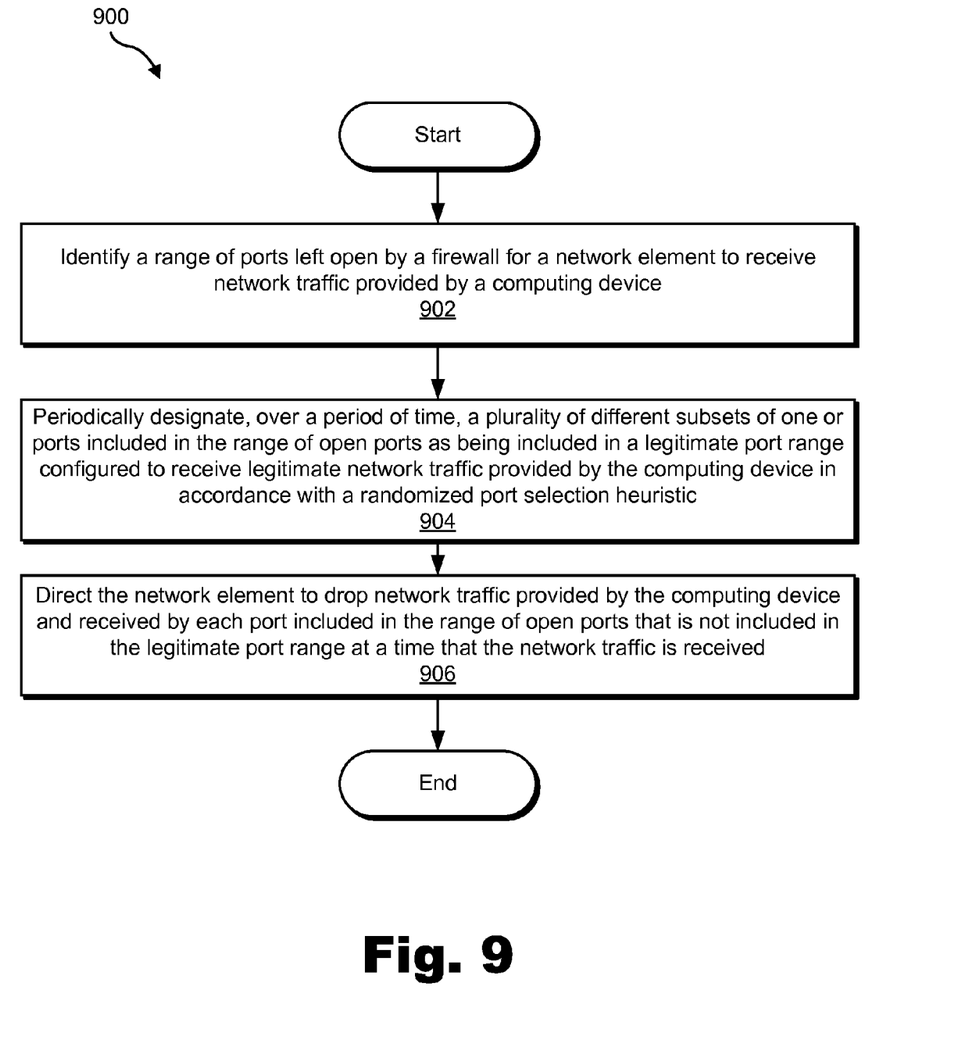
FIG. 9 illustrates an exemplary method of mitigating attack traffic directed at a network element according to principles described herein.

FIG. 9 illustrates another exemplary method 900 of mitigating attack traffic directed at a network element. While FIG. 9 illustrates exemplary steps according to one embodiment, other embodiments may omit, add to, reorder, and/or modify any of the steps shown in FIG. 9. One or more of the steps shown in FIG. 9 may be performed by attack traffic mitigation system 400 and/or any implementation thereof.

In step 902, an attack traffic mitigation system identifies a range of ports left open by a firewall for a network element to receive network traffic provided by a computing device. Step 902 may be performed in any of the ways described herein.

In step 904, the attack traffic mitigation system periodically designates, over a period of time, a plurality of different subsets of one or ports included in the range of open ports as being included in a legitimate port range configured to receive legitimate network traffic provided by the computing device in accordance with a randomized port selection heuristic. As described above, only one subset of one or more ports included in the plurality of subsets of one or more ports is included in the legitimate port range at any given time. Step 904 may be performed in any of the ways described herein.

In step 906, the attack traffic mitigation system directs the network element to drop network traffic provided by the computing device and received by each port included in the range of open ports that is not included in the legitimate port range at a time that the network traffic is received. Step 906 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 10:
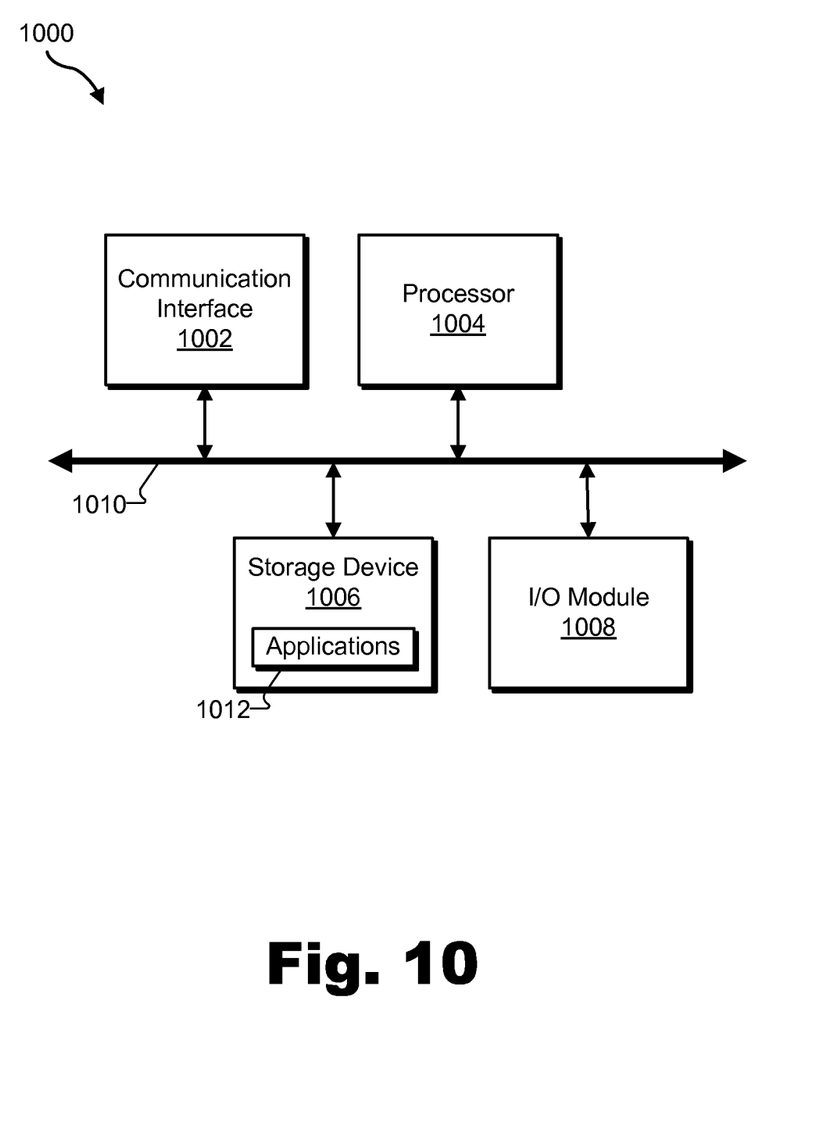
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1000. For example, one or more applications 1012 residing within storage device 1006 may be configured to direct processor 1004 to perform one or more processes or functions associated with detection facility 402, and/or port management facility 404. Likewise, storage facility 406 may be implemented by or within storage device 1006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    identifying, by an attack traffic mitigation system, a range of ports left open by a firewall for a network element to receive, by way of the firewall, network traffic provided by a computing device;
    designating, by the attack traffic mitigation system, a subset of one or more ports included in the range of open ports as being included in a legitimate port range configured to receive, by way of the firewall, legitimate network traffic provided by the computing device;
    removing, by the attack traffic mitigation system after a predetermined amount of time subsequent to the subset of one or more ports being designated as being included in the legitimate port range, the subset of one or more ports from being included in the legitimate port range;
    designating, by the attack traffic mitigation system, a new subset of one or more ports included in the range of open ports as being included in the legitimate port range, wherein the new subset of one or more ports includes at least one port not included in the subset of one or more ports; and directing, by the attack traffic mitigation system, the network element to drop network traffic provided by the computing device and received by each port included in the range of open ports that is not included in the legitimate port range at a time that the network traffic is received, wherein the designating of the subset of one or more ports as being included in the legitimate port range and the designating of the new subset of one or more ports as being included in the legitimate port range each comprises negotiating with the computing device to select the one or more ports for inclusion in the legitimate port range.

2. The method of claim 1, wherein the negotiating comprises:

selecting the one or more ports for inclusion in the legitimate port range;

transmitting a message comprising data representative of the selected one or more ports to the computing device; and receiving, in response to the message, an acknowledgement of the selected one or more ports from the computing device.

3. The method of claim 2, wherein:

the transmitting comprises transmitting the message by way of a call session control function element; and the receiving comprises receiving the acknowledgement by way of the call session control function element.

4. The method of claim 2, wherein the negotiating further comprises:

transmitting, in response to the acknowledgement, an additional message comprising data representative of the selected one or more ports and data representative of the acknowledgement to the network element;

receiving, in response to the additional message, an acknowledgement from the network element; and transmitting data representative of the acknowledgement received from the network element to the computing device.

5. The method of claim 1, wherein the designating of the subset of one or more ports as being included in the legitimate port range and the designating of the new subset of one or more ports as being included in the legitimate port range each comprises randomly selecting the one or more ports for inclusion in the legitimate port range in accordance with a randomized port selection heuristic.

6. The method of claim 1, wherein the designating of the subset of one or more ports as being included in the legitimate port range and the designating of the new subset of one or more ports as being included in the legitimate port range each comprises directing the computing device to route the legitimate network traffic to the subset of one or more ports.

7. The method of claim 1, further comprising directing, by the attack traffic mitigation system, the network element to transmit the legitimate network traffic to an additional computing device.

8. The method of claim 1, wherein:

the legitimate network traffic is generated by a legitimate application residing on the computing device; and the network traffic received by each port included in the range of open ports that is not included in the legitimate port range comprises attack traffic generated by malware residing on the computing device.

9. The method of claim 8, wherein the attack traffic comprises distributed denial-of-service attack traffic.

10. The method of claim 8, wherein the directing of the network element to drop network traffic provided by the computing device and received by each port included in the range of open ports that is not included in the legitimate port range comprises directing the network element to drop all network traffic provided by the computing device and received by each port included in the range of open ports that is not included in the legitimate port range.

11. The method of claim 1, wherein the subset of one or more ports included in the range of open ports and designated as being included in the legitimate port range comprises less than all of the ports included in the range of open ports.

12. A method comprising:

identifying, by an attack traffic mitigation system, a range of ports left open by a firewall for a network element to receive, by way of the firewall, network traffic provided by a computing device;

periodically designating, by the attack traffic mitigation system over a period of time, a plurality of different subsets of one or ports included in the range of open ports as being included in a legitimate port range configured to receive, by way of the firewall, legitimate network traffic provided by the computing device in accordance with a randomized port selection heuristic, wherein only one subset of one or more ports included in the plurality of subsets of one or more ports is included in the legitimate port range at any given time; and directing, by the attack traffic mitigation system, the network element to drop network traffic provided by the computing device and received by each port included in the range of open ports that is not included in the legitimate port range at a time that the network traffic is received;

wherein the periodically designating comprises designating a first subset of one or more ports included in the plurality of subsets of one or more ports as being included in the legitimate port range for a first predetermined amount of time, removing, in response to a completion of the first predetermined amount of time, the first subset of one or more ports from the legitimate port range, and designating, in response to the removing, a second subset of one or more ports included in the plurality of subsets of one or more ports as being included in the legitimate port range for a second predetermined amount of time, wherein the second subset of one or more ports includes at least one port not included in the first subset of one or more ports; and wherein the periodically designating of the plurality of different subsets of one or more ports as being included in the legitimate port range comprises negotiating with the computing device to select the one or more ports for inclusion in the legitimate port range.

13. A system comprising:

at least one computing device including a processor and comprising:

a detection facility circuitry configured to identify a range of ports left open by a firewall for a network element to receive, by way of the firewall, network traffic provided by a computing device; and a port management facility circuitry communicatively coupled to the detection facility circuitry and configured to designate a subset of one or more ports included in the range of open ports as being included in a legitimate port range configured to receive, by way of the firewall, legitimate network traffic provided by the computing device, remove, after a predetermined amount of time subsequent to the subset of one or more ports being designated as being included in the legitimate port range, the subset of one or more ports from being included in the legitimate port range, designate a new subset of one or more ports included in the range of open ports as being included in the legitimate port range, wherein the new subset of one or more ports includes at least one port not included in the subset of one or more ports, and direct the network element to drop network traffic provided by the computing device and received by each port included in the range of open ports that is not included in the legitimate port range at a time that the network traffic is received, wherein the port management facility circuitry designates the subset of one or more ports as being included in the legitimate port range and designates the new subset of one or more ports as being included in the legitimate port range by negotiating with the computing device to select the one or more ports for inclusion in the legitimate port range.

14. The system of claim 13, wherein the port management facility circuitry is configured to designate the subset of one or more ports as being included in the legitimate port range by randomly selecting the one or more ports for inclusion in the legitimate port range in accordance with a randomized port selection heuristic.

15. The system of claim 13, wherein the port management facility circuitry is configured to designate the subset of one or more ports as being included in the legitimate port range by directing the computing device to route the legitimate network traffic to the subset of one or more ports.

16. A non-transitory computer-readable medium comprising computer-executable instructions configured to direct at least one computing device to:

identify a range of ports left open by a firewall for a network element to receive, by way of the firewall, network traffic provided by a computing device;

designate a subset of one or more ports included in the range of open ports as being included in a legitimate port range configured to receive, by way of the firewall, legitimate network traffic provided by the computing device;

remove, after a predetermined amount of time subsequent to the subset of one or more ports being designated as being included in the legitimate port range, the subset of one or more ports from being included in the legitimate port range;

designate a new subset of one or more ports included in the range of open ports as being included in the legitimate port range, wherein the new subset of one or more ports includes at least one port not included in the subset of one or more ports; and direct the network element to drop network traffic provided by the computing device and received by each port included in the range of open ports that is not included in the legitimate port range at a time that the network traffic is received, wherein the designation of the subset of one or more ports as being included in the legitimate port range and the designation of the new subset of one or more ports as being included in the legitimate port range each comprises negotiating with the computing device to select the one or more ports for inclusion in the legitimate port range.

17. A non-transitory computer-readable medium comprising computer-executable instructions configured to direct at least one computing device to:

identify a range of ports left open by a firewall for a network element to receive, by way of the firewall, network traffic provided by a computing device;

periodically designate, over a period of time, a plurality of different subsets of one or more ports included in the range of open ports as being included in a legitimate port range configured to receive, by way of the firewall, legitimate network traffic provided by the computing device in accordance with a randomized port selection heuristic, wherein only one subset of one or more ports included in the plurality of subsets of one or more ports is included in the legitimate port range at any given time; and direct the network element to drop network traffic provided by the computing device and received by each port included in the range of open ports that is not included in the legitimate port range at a time that the network traffic is received;

wherein the periodic designation comprises designating a first subset of one or more ports included in the plurality of subsets of one or more ports as being included in the legitimate port range for a first predetermined amount of time, removing, in response to a completion of the first predetermined amount of time, the first subset of one or more ports from the legitimate port range, and designating, in response to the removing, a second subset of one or more ports included in the plurality of subsets of one or more ports as being included in the legitimate port range for a second predetermined amount of time, wherein the second subset of one or more ports includes at least one port not included in the first subset of one or more ports; and wherein the periodic designation of the plurality of different subsets of one or more ports as being included in the legitimate port range comprises negotiating with the computing device to select the one or more ports for inclusion in the legitimate port range.

* * * * *